United States Patent
Cherian et al.

(10) Patent No.: US 8,910,235 B2
(45) Date of Patent: Dec. 9, 2014

(54) POLICY BASED PROVISIONING OF SHARED BOOT IMAGES

(75) Inventors: Jacob Cherian, Austin, TX (US);
Gaurav Chawla, Austin, TX (US);
Travis Vigil, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1839 days.

(21) Appl. No.: 11/961,299

(22) Filed: Dec. 20, 2007

(65) Prior Publication Data

US 2009/0164769 A1    Jun. 25, 2009

(51) Int. Cl.
*G06F 17/00* (2006.01)
*G06F 11/00* (2006.01)
*G06F 11/16* (2006.01)
*H04L 29/06* (2006.01)
*G06F 9/44* (2006.01)
*G06F 21/57* (2013.01)

(52) U.S. Cl.
CPC ............ *G06F 9/4416* (2013.01); *G06F 9/4408* (2013.01); *G06F 21/57* (2013.01); *G06F 9/4401* (2013.01)
USPC .................. 726/1; 714/4.11; 714/6.3; 714/13

(58) Field of Classification Search
CPC ... G06F 9/4401; G06F 9/4408; G06F 9/4416; G06F 21/57
See application file for complete search history.

(56) References Cited

U.S. PATENT DOCUMENTS

| | | | |
|---|---|---|---|
| 6,880,002 B2 | 4/2005 | Hirschfeld et al. | |
| 7,207,039 B2 | 4/2007 | Komarla et al. | |
| 7,499,988 B2 * | 3/2009 | Keohane et al. | 709/221 |
| 8,028,054 B1 * | 9/2011 | Watanabe et al. | 709/223 |
| 2003/0084209 A1 * | 5/2003 | Chadalapaka | 710/5 |
| 2003/0126242 A1 * | 7/2003 | Chang | 709/222 |
| 2005/0050539 A1 | 3/2005 | Burkhardt et al. | |
| 2005/0138423 A1 | 6/2005 | Ranganathan | |
| 2008/0082314 A1 * | 4/2008 | Kochar et al. | 703/25 |
| 2008/0209196 A1 * | 8/2008 | Hernandez et al. | 713/2 |

OTHER PUBLICATIONS

Prasenjit Sarkar, Duncan Missimer, and Constantine Sapuntzakis; Bootstrapping Clients Using the iSCSI Protocol; Feb. 27, 2003; p. 1-p. 10, http://tools.ietf.org/wg/ips/draft-ietf-ips-iscsi-boot/draft-ietf-ips-iscsi-boot-10-from-09.diff.txt.
Cisco Systems airespace; Cisco SWAN Release Notes 2.2.127.9; System Release 2.2; Mar. 22, 2005; p. 1-p. 16; OL-7431-01 Rev 1; http://www.cisco.com/univercd/cc/td/doc/product/wireless/control/c41/sysrn.pdf.
Shannon Kietzman; Wisegeek; What Is Provisioning; 2007; p. 1-p. 3; Conjecture Corporation; http://www.wisegeek.com/what-is-provisioning.htm.
Provisioning—Wikipedia, the free encyclopedia; Provisioning; Nov. 13, 2007; p. 1-p. 4; Wikipedia Foundation, Inc.; http://en.wikipedia.org/wiki/Provisioning.

* cited by examiner

*Primary Examiner* — Azizul Choudhury
(74) *Attorney, Agent, or Firm* — Haynes and Boone, LLP

(57) ABSTRACT

A method for policy based provisioning of shared boot images includes querying a storage name server for boot target that is in an accessible discovery domain. Boot target information about the boot target is received. A login request is sent to the boot target. The login request includes a flag specifying whether the login request is a first login request after a reboot.

10 Claims, 3 Drawing Sheets

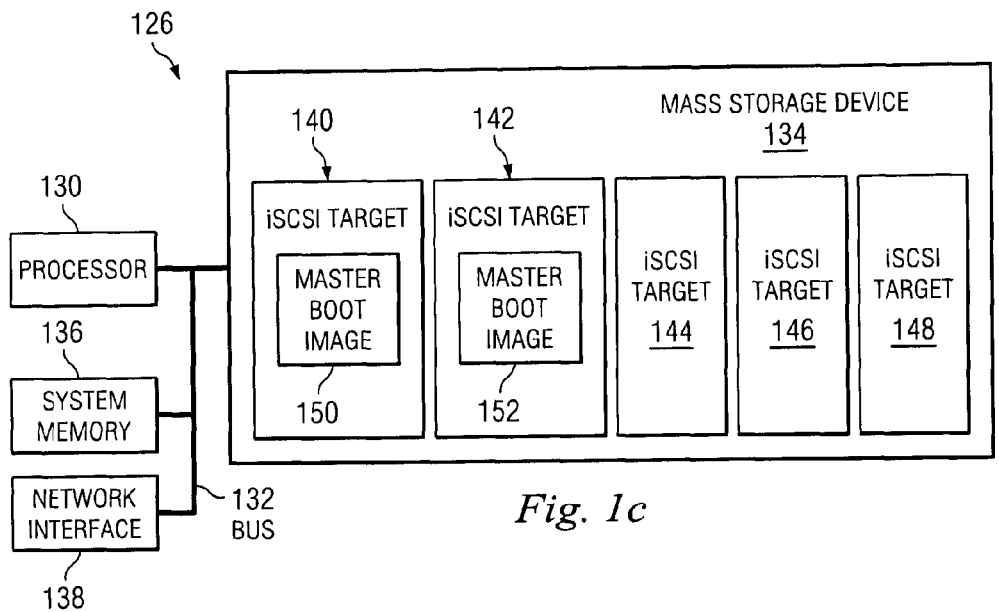

POLICY BASED PROVISIONING OF SHARED BOOT IMAGES

CROSS REFERENCE TO RELATED APPLICATIONS

The present application is related to U.S. Utility Application Ser. No. 11/961,048, filed on Dec. 20, 2007, and U.S. Utility Application Ser. No. 11/961,079, filed on Dec. 20, 2007, the disclosures of which are incorporated herein by reference.

BACKGROUND

The present disclosure relates generally to information handling systems, and more particularly to provisioning shared boot images to information handling systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs are diskless (i.e., do not include mass storage devices). A diskless IHS may not include an operating system (OS), and thus the diskless IHS may be required to access a boot image over a network for booting and loading an OS. Typically, each diskless IHS may be provisioned a dedicated disk image. Even if multiple diskless IHSs are booting from the same OS, a separate disk image may be provisioned for each diskless IHS.

This may work well for a small number of diskless IHSs and corresponding provisioned images. However, as the number of diskless IHSs and corresponding provisioned images increase, the complexity of management, maintenance, and servicing of the images may increase exponentially. For example, when new applications or patches need to be added to the images, each image may have to be patched individually.

Accordingly, it would be desirable to provide an improved system and method to provision shared boot images to information handling systems.

SUMMARY

According to one embodiment, a method for policy based provisioning of shared boot images includes querying a storage name server for boot target that is in an accessible discovery domain. Boot target information about the boot target is received. A login request is sent to the boot target. The login request includes a flag specifying whether the login request is a first login request after a reboot.

BRIEF DESCRIPTION OF THE DRAWINGS

FIG. 1c illustrates an embodiment of an iSCSI server used in the system for provisioning a boot image of FIG. 1b.

FIG. 2b illustrates an embodiment of a Target Configuration and Policies data structure used in the method of FIG. 2a.

FIG. 2c illustrates an embodiment of a Discovery Domain data structure used in the method of FIG. 2a

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1A:
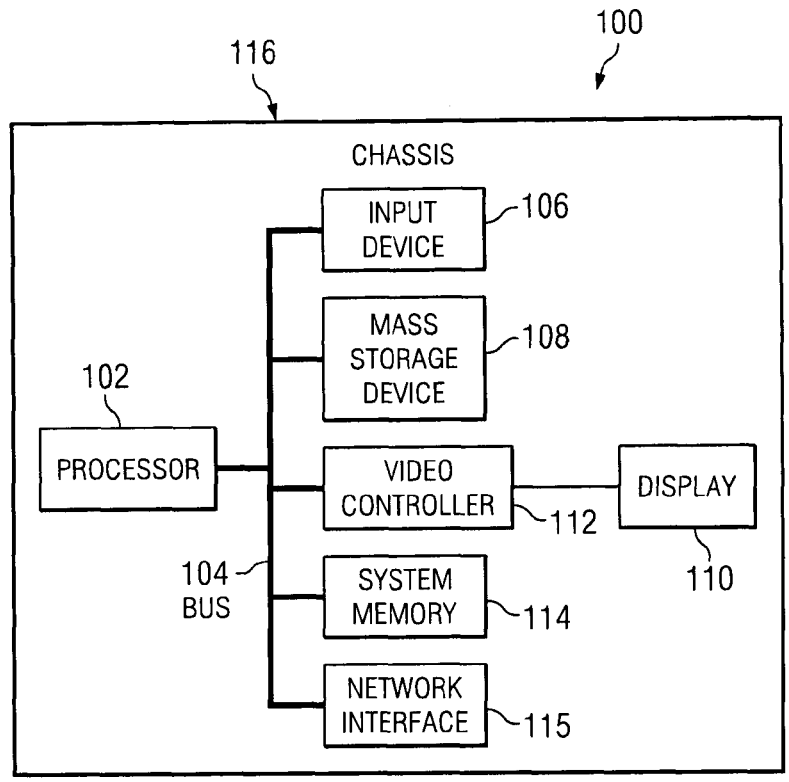
FIG. 1a illustrates an embodiment of an information handling system (IHS).

In one embodiment, IHS 100, FIG. 1a, includes a processor 102, which is connected to a bus 104. Bus 104 serves as a connection between processor 102 and other components of computer system 100. An input device 106 is coupled to processor 102 to provide input to processor 102. Examples of input devices include keyboards, touchscreens, and pointing devices such as mice, trackballs and trackpads. Programs and data are stored on a mass storage device 108, which is coupled to processor 102. Mass storage devices include such devices as hard disks, optical disks, magneto-optical drives, floppy drives and the like. IHS 100 further includes a display 110, which is coupled to processor 102 by a video controller 112. A system memory 114 is coupled to processor 102 to provide the processor 102 with fast storage to facilitate execution of computer programs by processor 102. A network interface 115 is coupled to processor 102 to provide access to a network. In an embodiment, a chassis 116 houses some or all of the components of IHS 100. It should be understood that other buses and intermediate circuits can be deployed between the components described above and processor 102 to facilitate interconnection between the components and the processor 102.

Figure 1B:
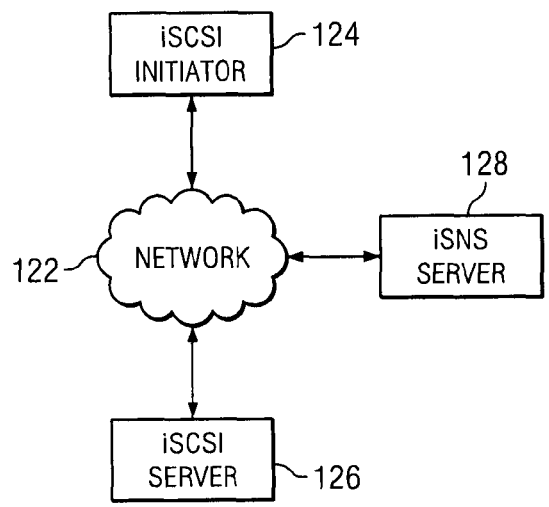
FIG. 1b illustrates an embodiment of a system for provisioning a boot image.

Referring now to FIG. 1b, an embodiment of a system 120 for provisioning a boot image is illustrated. The system 120 includes a network 122 (e.g., a Transport Control Protocol/Internet Protocol (TCP/IP) network), which is coupled to an Internet Small Computer System Interface (iSCSI) initiator 124, an iSCSI server 126, and an Internet Storage Name Service (iSNS) server 128. Each of the iSCSI initiator 124, the iSCSI server 126, and the iSNS server 128 may include an IHS similar to the IHS 100, and accordingly each may communicate with each other over the network 122.

For clarity, FIG. 1b depicts only one iSCSI initiator, one iSCSI server, and one iSNS server. However, it should be understood that a plurality of iSCSI initiators, iSCSI servers, and iSNS servers may be used in accordance with the present embodiments. Furthermore, it should be understood that in some embodiments, a variety of other storage systems and protocols may be used in a similar fashion as described herein.

Referring now to FIG. 1c, the iSCSI server 126 is illustrated in more detail. The iSCSI server 126 includes a processor 130, a bus 132, a mass storage device 134, a system memory 136, and a network interface 138, each of which may function in a manner similar to the processor 102, the bus 104, the mass storage device 108, the system memory 114, and the network interface 115, respectively, of the IHS 100 of FIG. 1a. The mass storage device 134 includes iSCSI targets 140, 142, 144, 146, and 148. Each of the iSCSI targets 140, 142, 144, 146, and 148 is assigned an iSCSI Qualified Name (IQN). Accordingly, each of the iSCSI targets 140, 142, 144, 146, and 148 may provide one or more disk images to iSCSI initiators (e.g., the iSCSI initiator 124) on the network 122. For clarity, each of the iSCSI targets 140, 142, 144, 146, and 148 provides no more than one Logical Unit (LU) (e.g., one block device including one disk image). However, it should be understood that an iSCSI target may provide a plurality of LUs, and thus a plurality of block devices and/or disk images in accordance with the present embodiments.

The iSCSI targets 140 and 142 include master boot images 150 and 152, respectively. In an embodiment, the master boot images 150 and 152 are original versions of bootable operating system (OS) images that may be copied in order to create additional bootable OS images to be included in additional iSCSI targets such as iSCSI targets 144, 146, and 148. In an embodiment, the iSCSI targets 144, 146, and/or 148 may include no images, empty images, data images, or non-master boot images (e.g., bootable OS images that may not be intended to be copied).

The iSCSI initiator 124 may be allowed to access disk images on one or more of the iSCSI targets 140, 142, 144, 146, and 148 in order to boot an OS or access data. The iSNS server 128 may include a variety of information about the iSCSI server 126 and the iSCSI initiator 124. The iSCSI initiator 124 may query the iSNS server 128 in order to discover the one or more of the iSCSI targets 140, 142, 144, 146, and 148 on the iSNS server 128. In an embodiment, the iSCSI initiator 124 may include a virtual machine (VM).

The iSNS server 128 may include policy information about each of the iSCSI targets 140, 142, 144, 146, and 148. Policy information about a target may include whether the iSCSI target is a parent target or a child target. A parent target may include a parent image that is copied to create a child image on a child target. In the system 120, the iSCSI targets 140 and 142 may be considered to be parent targets, and the master boot images 150 and 152 may be considered to be parent images. Policy information about a target may additionally include information about provisioning the target, such as identification of a parent target of the target, access permissions for the target (e.g., read-only or read-write), a list of iSCSI initiators that are allowed access to the target, and a provisioning policy for the target. A provisioning policy may include whether a disk image in the target is dedicated (e.g., for use by a single iSCSI initiator) or shared (e.g., for use by several iSCSI initiators). A provisioning policy may further include whether writes to a disk image in the target by an iSCSI initiator are persistent or non-persistent across reboots of the iSCSI initiator.

Figure 2A:
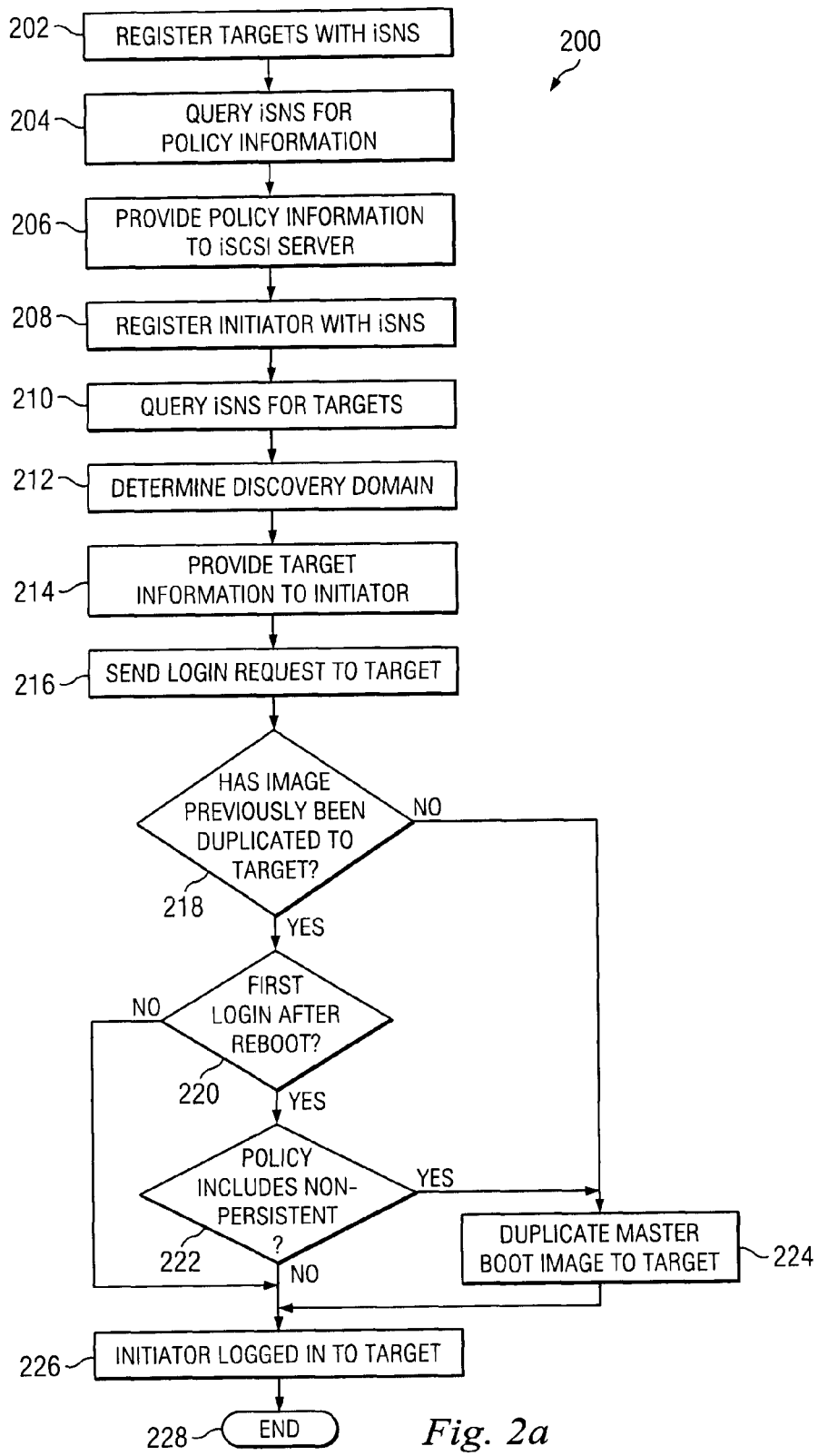
FIG. 2a illustrates an embodiment of a method to provision a boot image using the system of FIG. 1b.

Referring now to FIGS. 2a and 2b, an embodiment of a method 200 to provision a boot image is illustrated. The method 200 begins at block 202 where the iSCSI server 126 registers the iSCSI targets 140, 142, 144, 146, and 148 with the iSNS server 128. The registering may include notifying the iSNS server 126 that the iSCSI targets 140, 142, 144, 146, and 148 are available on the network 122. The registering may additionally include specifying target information about each of the iSCSI targets 140, 142, 144, 146, and 148. Target information about an iSCSI target may include the IQN of the iSCSI target. Target information about an iSCSI target may additionally include information about a type of image included in the iSCSI target, such as whether the iSCSI target includes a master boot image, a non-master boot image, a data image, or no image. For example, as part of the registration, the iSCSI server 126 may specify that the iSCSI targets 140 and 142 include master boot images (i.e., the master boot images 150 and 152 respectively). Correspondingly, for example, the iSCSI server 126 may specify during registration that the iSCSI targets 144, 146, and 148 do not include images.

The method 200 then proceeds to block 204 where the iSCSI server 126 queries the iSNS server 128 for policy information, described above. The method 200 then proceeds to block 206 where the iSNS server 128 provides policy information to the iSCSI server 126.

Referring now to FIG. 2b, in an embodiment, the policy information provided by the iSNS server 128 may be included in a Target Configuration and Policies data structure 250. Column 252 represents child target identifiers of the child targets to be provisioned to iSCSI initiators. Column 254 represents parent target identifiers for the respective child targets, column 256 represents access permissions for the respective child targets, and column 258 represents provisioning policies for the respective child targets. For clarity, the target identifiers in columns 252 and 254 are depicted as Target 140, Target 142, Target 144, Target 146, and Target 148 to correspond to the iSCSI targets 140, 142, 144, 146, and 148 respectively. However, one of skill in the art will recognize that IQNs or any other target identifiers may be used instead. Row 260 includes policy information for iSCSI target 144, indicating that the parent target is iSCSI target 140, the access permission is read-write (RW), and that writes are non-persistent across iSCSI initiator reboots. Row 262 includes policy information for iSCSI target 146, indicating that the parent target is iSCSI target 140, the access information is RW, and that writes are persistent across iSCSI initiator reboots. Row 264 includes policy information for iSCSI target 148, indicating that the parent target is iSCSI target 142, the access information is RW, and that writes are persistent across iSCSI initiator reboots. In an embodiment, the iSNS server 128 may provide additional policy information for the iSCSI targets 140 and 142 such as, for example, that they may be provided with access permissions of read-only. In an embodiment, the Target Configuration and Policies data structure 250 may be stored in a centralized repository such as, for example, in a database and/or in the iSNS server 128.

The method 200 then proceeds to block 208 where the iSCSI initiator 124 registers with the iSNS server 128. The method 200 then proceeds to block 210 where the iSCSI initiator 124 queries the iSNS server 128 for iSCSI targets.

The method 200 then proceeds to block 212 where the iSNS server 128 determines which iSCSI targets are in a discovery domain of the iSCSI initiator 124. The discovery domain may include one or more iSCSI targets which the iSCSI initiator 124 is allowed to access. The iSNS server 128 may include discovery domain information about several discovery domains.

Referring to FIG. 2c, in an embodiment, the iSNS server 128 may include a Discovery Domain data structure 270 which may include discovery domain information about a discovery domain including the iSCSI initiator 124. Column 272 represents initiator identifiers for the iSCSI initiators (i.e., iSCSI initiator 124) in the discovery domain. Column 274 represents target identifiers for iSCSI targets (i.e., the iSCSI target 144 and a Target A) in the discovery domain, and column 276 represents corresponding purposes of the iSCSI targets in the discovery domain. Column 276 indicates that a purpose of the iSCSI target 144 includes a boot image and a purpose of Target A includes data. In an embodiment, the purpose of an image may include the type, described above, of the image. In an embodiment, the iSCSI targets 146 and 148 may be included in a separate discovery domain.

The method 200 then proceeds to block 214 where the iSNS server 128 provides iSCSI target information to the iSCSI initiator 124. In an embodiment, the iSCSI target information may include iSCSI targets and purposes in a discovery domain of the iSCSI initiator 124, such as the information in columns 274 and 276 of the Discovery Domain data structure 270.

The method 200 then proceeds to block 216 where the iSCSI initiator 124 sends a login request to the iSCSI target 144. In an embodiment, the iSCSI initiator 124 may use the purpose information (e.g., column 276 of the Discovery Domain data structure 270) to determine to which iSCSI target the iSCSI initiator 124 should send a login request. In an embodiment, the login request may include a modified login Protocol Data Unit (PDU). The modified login PDU may include a login PDU and a first-login-after-reboot flag which specifies whether this is the first login to the iSCSI target 144 after a reboot of the iSCSI initiator 124. In an embodiment, the modified login PDU may be assembled and sent by executable firmware code in an option Read Only Memory (ROM) in a network interface controller (NIC) in the iSCSI initiator 124.

The method 200 then proceeds to decision block 218 where the iSCSI server 126 determines whether the master boot image 150 has previously been copied from the iSCSI target 140 to the iSCSI target 144. If at decision block 218 the iSCSI server 126 determines that the master boot image 150 has previously been copied from the iSCSI target 140 to the iSCSI target 144, the method 200 proceeds to decision block 220 where the iSCSI server 126 determines whether this is the first login of the iSCSI initiator 124 to the iSCSI target 144 after a reboot of the iSCSI initiator 124. In an embodiment, the iSCSI server 126 may make the determination by inspecting the first-login-after-reboot flag in the modified login PDU from the iSCSI initiator 124.

If at decision block 220 the iSCSI server 126 determines that this is the first login of the iSCSI initiator 124 to the iSCSI target 144 after a reboot of the iSCSI initiator 124, the method 200 proceeds to decision block 222 where the iSCSI server 126 determines if the policy information associated with the iSCSI target 144 includes that writes should be non-persistent. In an embodiment, the iSCSI server 126 may make the determination by examining column 258 and row 260 of the Target Configuration and Policies data structure 250, described above with reference to FIG. 2c.

If at decision block 222 the iSCSI server 126 determines that the policy information associated with the iSCSI target 144 includes that writes should be non-persistent, the method 200 proceeds to block 224 where the iSCSI server 126 copies the master boot image 150 from the iSCSI target 140 to the iSCSI target 144. In an embodiment, the copying may include taking a snapshot of the master boot image 150, cloning the master boot image 150, duplicating the master boot image 150, or copying files from the master boot image 150. In an embodiment, the copying may cause any previous writes to a disk image in the iSCSI target 144 to be discarded.

The method 200 then proceeds to block 226 where the iSCSI initiator 124 is successfully logged in to the iSCSI target 144. The iSCSI initiator 124 may then access the child boot image on the iSCSI target 144. In an embodiment, the iSCSI initiator 124 may then proceed to continue a boot process by reading OS files from the child boot image. The method 200 then ends at block 228.

If at decision block 218 the iSCSI server 126 determines that the master boot image 150 has not been previously copied from the iSCSI target 140 to the iSCSI target 144, the method 200 proceeds to block 224 where the iSCSI server 126 copies the master boot image 150 from the iSCSI target 140 to the iSCSI target 144, as described above.

If at decision block 220 the iSCSI server 126 determines that this is not the first login of the iSCSI initiator 124 to the iSCSI target 144 after a reboot of the iSCSI initiator 124, the method 200 proceeds to block 226 where the iSCSI initiator 124 is successfully logged in to the iSCSI target 144, as described above.

If at decision block 222 the iSCSI server 126 determines that the policy information associated with the iSCSI target 144 does not include that writes should be non-persistent (e.g., the policy information includes that writes should be persistent, or that the access permissions are read-only), the method 200 proceeds to block 226 where the iSCSI initiator 124 is successfully logged in to the iSCSI target 144, as described above.

Thus, embodiments are provided for policy-based provisioning of boot images. Policies for provisioning the boot images may be stored in a centralized repository. Initiators and targets may be stateless (i.e., no persistent configuration information is stored on the initiators and targets), which may enable administrators to easily replace and redeploy servers, targets, and initiators. The boot images may be dedicated or shared. Some of the boot images may be copied from master boot images. Some of the boot images may be provisioned as non-persistent, wherein initiator writes are discarded on an initiator reboot.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:
1. A method comprising:
   querying, by an initiator device, a storage name server for a plurality of boot targets that are in an accessible discovery domain;
   receiving, by the initiator device, boot target information for each of the plurality of boot targets, wherein the boot target information indicates that a first boot target of the plurality of boot targets includes a boot image and at least one second boot target of the plurality of boot targets does not include a boot image;

determining, by the initiator device using the boot target information, that a login request should be sent to a first boot target based on the first boot target including the boot image;

sending, by the initiator device, the login request to the first boot target, wherein the login request includes a flag specifying that the login request is a first login request to the first boot target after a reboot; and accessing, by the initiator device, a copied master boot image on the first boot target, wherein the copied master boot image was copied by a server device from a parent boot target to the first boot target in response to receiving the login request that includes the flag specifying that the login request is the first login request to the first boot target after reboot and in response to write persistency policy information indicating that writes to the first boot target should be non-persistent.

2. The method of claim 1, wherein the boot target includes an Internet Small Computer System Interface (iSCSI) target, wherein the login request includes a modified login Protocol Data Unit (PDU), and wherein the modified PDU may include a login PDU and a first-login-after-reboot flag specifying whether the login request is the first login request after the reboot.

3. A method comprising:

registering, by a server device, a plurality of boot targets with a storage name server;

receiving, by the server device, policy information about the plurality of boot targets from the storage name server, wherein the plurality of boot targets include a first boot target and a second boot target;

receiving, by the server device, a login request from a boot client, wherein the login request is for logging in to the second boot target;

determining, by the server device, whether a master boot image of the first boot target has previously been copied to the second boot target to provide a previously copied master boot image on the second boot target;

in response to determining that the master boot image of the first boot target has previously been copied to the second boot target to provide the previously copied master boot image on the second boot target, determining, by the server device, whether the login request is a first login request from the boot client to the second boot target after a reboot of the boot client by checking a flag in the login request;

in response to determining that the login request is the first login request from the boot client to the second boot target after the reboot of the boot client, determining, by the server device, whether the policy information associated with the second boot target includes that writes should be non-persistent; and in response to determining that the policy information associated with the second boot target includes that writes should be non-persistent, copying, by the server device, the master boot image from the first boot target to the second boot target to provide a current copy of the master boot image on the second boot target such that the previously copied master boot image is discarded, and allowing the boot client to access the current copy of the master boot image on the second boot target.

4. The method of claim 3, further comprising:

in response to determining that the master boot image of the first boot target has not previously been copied to the second boot target, copying, by the server device, the master boot image from the first boot target to the second boot target to provide a current copy of the master boot image on the second boot target.

5. The method of claim 3, further comprising:

in response to determining that the policy information associated with the second boot target does not include that writes should be non-persistent, allowing the boot client to access the previously copied master boot image on the second boot target.

6. The method of claim 3, further comprising:

in response to determining that the login request is not the first login request from the boot client to the second boot target after the reboot of the boot client, allowing the boot client to access the previously copied master boot image on the second boot target.

7. The method of claim 3, wherein copying the master boot image to the second boot target to provide a current copy of the master boot image on the second boot target includes one of taking a snapshot of the master boot image, cloning the master boot image, duplicating the master boot image, and copying files from the master boot image.

8. The method of claim 3, wherein the determining whether the policy information associated with the second boot target includes that writes should be non-persistent includes examining a Target Configuration and Policies data structure.

9. The method of claim 3, wherein the determining whether the login request is the first login request from the boot client to the second boot target after the reboot of the boot client includes inspecting a first-login-after-reboot flag in a modified login Protocol Data Unit (PDU) from the boot client.

10. The method of claim 9, wherein the modified login PDU includes a login PDU that is modified to include the first-login-after-reboot flag, and wherein the first-login-after-reboot flag specifies whether the login request is the first login request from the boot client to the second boot target after the reboot of the boot client.

* * * * *